United States Patent Office 3,364,184
Patented Jan. 16, 1968

3,364,184
OIL - SOLUBLE POLYMERIC GLYCIDYL COMPOUNDS AND FUNCTIONAL ORGANIC COMPOSITIONS CONTAINING THEM
Maurits Krukziener and Petrus N. Van Der Heydt, Amsterdam, Netherlands, assignors to Shell Oil Company, New York, N.Y., a corporation of Delaware
No Drawing. Original application Sept. 19, 1960, Ser. No. 56,654, now Patent No. 3,166,504, dated Jan. 1, 1965. Divided and this application Dec. 1, 1964, Ser. No. 415,162
Claims priority, application Netherlands, Dec. 4, 1959, 246,087
5 Claims. (Cl. 260—79.5)

ABSTRACT OF THE DISCLOSURE

Copolymers of (1) unsaturated glycidyl ethers or esters and (2) polymerizable esters of unsaturated alcohols and saturated carboxylic acids or saturated alcohols and acrylic acids which have been modified with a polar agent are useful as lubricant and fuel additives.

---

This patent application is a division of copending patent application Ser. No. 56,654, filed Sept. 19, 1960, which issued Jan. 1, 1965, as Patent No. 3,166,504.

This invention relates to oil-soluble "polar-modified" copolymers of (A) a polymerizable ether or ester compound containing an oxirane or epoxy ring

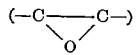

or its counterpart

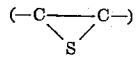

and (B) a polymerizable unsaturated ester which contains an oil-solubilizing hydrocarbyl radical of at least 8 carbon atoms, preferably from 12 to 30 carbon atoms.

The polymerizable compound (A) include unsaturated ethers or esters of glycidyl compounds such as vinyl or allyl glycidyl ether or its thio counterpart or esters of epoxy alcohols or thio-epoxy alcohols such as glycidol or thioglycidol, with unsaturated aliphatic carboxylic acids such as acrylic, methacrylic and crotonic acids or diesters of these epoxy alcohols or thio-epoxy alcohols with unsaturated aliphatic or acids having at least an 8 carbon, preferably a 12–18 carbon chain in the molecule such as esters of unsaturated alcohols (vinyl or allyl) and unsaturated $C_{8-30}$ aliphatic carboxylic acids such as vinyl decanoate, vinyl laurate, vinyl tridecanoate, vinyl myristate, vinyl pentadecanoate, vinyl palmitate, vinyl margarate, vinyl stearate, vinyl nonadecanoate, vinyl arachidate, vinyl behenate, vinyl 4,5,6-trimethyldodecanoate, vinyl 12-hydroxystearate, vinyl 9,10-dihydroxystearate, vinyl chlorostearate, vinyl cyanostearate, vinyl acetylstearate, allyl palmitate or esters of saturated alcohols and unsaturated acrylic acids such as $C_{8-30}$ alkyl acrylate or methacrylate, e.g., decyl acrylate, lauryl acrylate, stearyl acrylate, decyl methacrylate, lauryl methacrylate, cetyl methacrylate, stearyl methacrylate, eiconanyl acrylate, docosanyl acrylate and the like, and mixtures thereof. Mixtures of monomers (B) may be used in preparing the copolymers of this invention to which may be also incorporated a small amount (5–30% of the total polymer) of an acrylate ester of an acrylic acid and a $C_{1-4}$ alkanol and mixtures of esters containing a $C_{8-30}$ alkyl group may be used. Illustrative examples of such mixed esters include decylmethacrylate/octadecyl methacrylate; tetradecyl methacrylate/hexadecyl methacrylate; tetradecyl acrylate/octadecyl methacrylate; dodecyl methacrylate/eicosanyl acrylate; vinyl laurate/vinyl stearate and the like.

When mixtures of higher acrylate esters are used, it is highly desirable to have a substantial difference in the number of carbon atoms of the alcohol portion. Particularly superior results are obtained when one of the acrylate esters is a $C_{10}$ to $C_{14}$ acrylate ester and the other is a $C_{16}$ to $C_{20}$ acrylate ester.

In the mixtures, the different long chain acrylate esters are employed in mol ratios from 1:4 to 4:1. The superior copolymers are obtained when the higher ester, e.g., those having from 10 to 20 carbon atoms in the alcohol portion, and the lower esters, e.g., those having from 10 to 14 carbon atoms in the alcohol portion are combined in a mol ratio varying from 1:1 to 1:3.

The other type of component used in making the (B) copolymers is an ester of an acrylic acid and a lower aliphatic alcohol of not more than 4 carbon atoms. Examples of these lower acrylates include, among others, the acrylic acid and methacrylic acid esters of methanol, ethanol, butanol, hexanol, isobutyl alcohol and propanol.

This other type of component is used only in certain specific amounts. It has been found that the ester of the acrylic acids and the aliphatic alcohol containing not more than 6 carbon atoms should be employed in less than 30 mol percent of the total of the acrylate esters. Preferably the lower acrylate ester is employed in amounts varying from 5% to 20% by weight of the total of the acrylate esters or vinyl esters.

The mol ratio of monomers (A) and (B) may vary from 1:10 to 1:1 respectively, preferably from 1:2 to 1:5.

By the term "polar modified" herein is meant is copolymer resulting from polymerization of (A) and (B) as defined above to a molecular weight range of from 25,000 to 800,000 and modifying from 10% to 100% of the epoxy or thio-epoxy rings in the copolymer with reactive polar-containing compounds (X) capable of imparting detergent, extreme pressure, anti-wear, anti-oxidant and other fuel and oil-improving properties, said polar-containing compounds being oxygen, sulfur, phosphorus and/or nitrogen-containing compounds such as $C_{8-18}$ fatty acids, e.g., lauric, palmitic, stearic, oleic acids; thiocarboxylic acids, e.g., mono or dithioacetic, propionic, butyric or octanioic acids, organic phosphites, phosphates, phosphonates, or thio derivatives of said esters such as dialkyl, diaryl, dicycloalkyl, dialkaryl, diaralkyl phosphites, phosphates, and phosphonates, and their thioderivatives, e.g., dimethyl, diethyl, dilauryl, diphenyl, dicresyl, dicyclohexyl, dithioethyl, dithiolauryl, dithiocresyl, di(3-thiaheptyl), di(3-thiastearyl) phosphites and phosphates, dibutylphenyl phosphate, diphenylphosphinodithionic acid, $C_{8-18}$ alkanols or alkanthiols, e.g., octyl, lauryl, stearyl alcohols, polyalkyl hydroxybenzyl alcohols or thioalcohols such as dodecyl mercaptan; amines, e.g., alkylamine, alkanolamine, e.g., ethylene diamine, or mono or diethanolamine, etc.

On reacting the epoxy or thioethoxy rings with polar-containing compounds (X) as described above, the final copolymer contains a plurality of polar units represented by

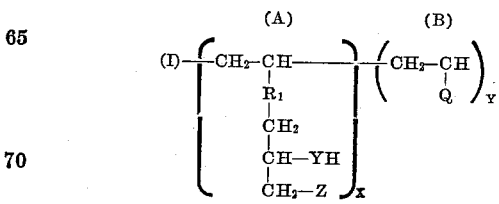

and

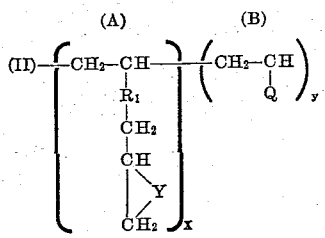

where $R_1$ is

or —O—, Y is oxygen or sulfur, Z is an organic residue containing O, S, P and/or N in the molecule and Q is selected from the group consisting of —COOR or —OOR where R is a $C_{8-30}$, preferably $C_{12-20}$ alkyl radical, $x$ and $y$ are integers the sum total resulting in a copolymer having a molecular weight range of from 25,000 to 800,000 in which the units (I) may range from 10% to 100% and the units (II) may constitute from zero to 90%, preferably from 5% to 25% of the total copolymer units. One or more monomers (A) may be copolymerized with one or more monomers (B) so that in the above formula dissimilar units of (A) and (B) in (I) and (II) may be present and these units (A) and (B) may be distributed in randon or block fashion.

The monomers (A) and (B) and their mixtures may be copolymerized in solution in a solvent such as benzene. If the copolymerization is carried out in a thin lubricating oil as solvent the copolymer is obtained in the form of a solution which is immediately suitable for addition to a lubricating oil. A telomerization agent such as nitrobenzene may also be added to the solution of the monomers. The copolymerization may, for example, be initiated by a thermal treatment or by addition, if desired at elevated temperature, of an initiator such as dibenzylperoxide, aziobisisobutyronitrile or other radical sources. When an initiator is used the optimum copolymerization temperature depends on the rate of decomposition of the initiator. If the reactivity of the monomers is so divergent that the monomer ratio in the copolymer differs substantially from the ratio in which the monomers are brought together for copolymerization, one of the monomers may be added in portions, thereby ensuring that a copolymer is formed which has a homogeneous composition.

By modifying the epoxide or thioethoxide-containing copolymer with organic compounds (X) copolymers having divergent properties are imparted to the final copolymer compound. Thus, copolymers may be prepared which impart either predominantly detergent properties to the lubricating oil or also have wear-resistant or antioxidant properties.

Copolymers which impart detergent properties and wear-resistant properties to lubricating oil may be formed from a monomer (A) which contains a polymerizable double bond and a carbon chain containing two adjacent carbon atoms forming part of an epoxy ring, or of which one carries a hydroxyl group and the other a methoxy group, or a dodecyl mercapto group and one or more monomers (B). Examples are the copolymer prepared from a mixture of lauryl and stearyl methacrylates and glycidyl methacrylate, the copolymer prepared from the copolymer of stearyl methacrylate and glycidyl methacrylate by converting this polymer with dodecyl mercaptan.

Copolymers which impart both detergent and wear-resistant properties to a lubricating oil and also give antioxidant properties may be prepared from a monomer (A) which contains a polymerizable double bond and a carbon chain containing two adjacent carbon atoms, one of which carries a hydroxyl group and the other a 3,5-ditertiary butyl-4-hydroxy-benzyloxy group or a benzphenothiazine-1-carboxy group and one or more monomers (B). Examples are the copolymers obtained by reacting a copolymer prepared from stearyl methacrylate and glycidyl methacrylate with 3,5-ditertiary butyl-4-hydroxybenzylalcohol or benzphenothiazine-1-carboxylic acid.

Copolymers capable of preventing friction wear resulting from heavy loads may be composed from a monomer (A) containing a polymerizable double bond and a carbon chain in which two adjacent carbon atoms form part of a thio-epoxy ring, or in which one of two adjacent atoms carries a hydroxyl or mercapto group and the other a methyl thiocarboxy group, a methyl dithio-carboxy group, a dimethyl phosphite group, a diphenyl phosphino-dithionic acid group or a bis(3-thiaheptyl)phosphite group and from one or more monomers (B). (A) copolymer is prepared, for example, from stearyl methacrylate and glycidyl methacrylate and then reacted with thioacetic acid or dithioacetic acid, dimethyl phosphite, diphenyl phsophonodithionic acid or bis(3-thiaheptyl) phosphite.

*Example I (intermediate).—Preparation of a copolymer from glycidyl methacrylate and stearyl methacrylate*

To a mixture of 71 parts by weight of glycidyl methacrylate and 1,690 parts by weight of stearyl methacrylate in 7,000 parts by weight of benzene there was added 13 parts by weight of benzoylperoxide at a bath temperature of 83° C. with stirring. After the boiling mixture had been stirred for one hour 11 parts by weight of glycidyl methacrylate were added, and then 6 portions of 10 parts by weight each every hour. In this way a total of 71 parts by weight of glycidyl methacrylate were added over a period of 7 hours. The reacting mixture was then stirred for 17 hours at a bath temperature of 83° C. After cooling to room temperature the reaction mixture was poured out into 20,000 parts by weight of methanol. Two layers were formed. The bottom layer was separated off and solvents removed therefrom by vacuum distillation. 1,650 parts by weight of copolymer were obtained. Its epoxy-oxygen content was determined by titration with pyridinium chloride. An epoxy-oxygen content was found of 0.49 milligram equivalents per gram of copolymer.

*Example II (intermediate).—Preparation of a copolymer from glycidyl methacrylate, stearyl methacrylate and lauryl methacrylate*

This copolymer was prepared in the same way as the copolymer in Example I. The starting material was a mixture of 71 parts by weight of glycidyl methacrylate, 845 parts by weight of stearyl methacrylate and 640 parts by weight of lauryl methacrylate in 6,200 parts by weight of benzene. During polymerization 71 parts by weight of glycidyl methacrylate were added. 1,551 parts by weight of copolymer of glycidyl methacrylate, stearyl methacrylate and lauryl methacrylate were obtained having an epoxy-oxygen content of 0.62 milligram equivalents per gram. The molecular weight determined by the light scattering technique was 228,000.

*Example III (intermediate).—Preparation of a copolymer of glycidyl methacrylate and stearyl methacrylate from a copolymer of stearyl methacrylate and methacrylic acid*

(a) *Preparation of a copolymer from stearyl methacrylate and methacrylic acid.*—To a mixture of 4,698 parts by weight of stearyl methacrylate and 86 parts by weight of methacrylic acid in 20,000 parts by weight of benzene there were added 45 parts by weight of benzoylperoxide at a bath temperature of 80° C. with stirring. After stirring for one hour, 37.5 parts by weight of methacrylic acid were added and then 5 portions of 37.5 parts by weight of methacrylic acid were added over a period of 6 hours. The reacting mixture was then stirred for 18 hours at a bath temperature of 80° C. After the reaction mixture had been cooled it was poured out into 80,000 parts by weight of methanol. Two layers were formed. The bottom layer was dissolved in 25,000 parts by weight of benzene. The acid number of the solution was determined by titration. This was 0.12 milligram equivalents per gram of solution.

(b) *Conversion of the polymer of stearyl methacrylate and methacrylic acid in a copolymer of stearyl methacrylate and glycidyl methacrylate.*—20,000 parts by weight of the solution in benzene of the copolymer of stearyl methacrylate and methacrylic acid, which solution had an acid number of 0.12 milligram equivalents per gram of benzene solution were neutralized with 1 N solution of sodium hydroxide in ethyl alcohol. The alcohol was then distilled off from this mixture, some benzene distilling over at the same time. 2,250 parts by weight of epichlorohydrin were added to the distillation residue as well as 2 parts by weight of tetramethylammonium bromide. The mixture was heated to its boiling temperature for 24 hours by refluxing it. After cooling the solution was poured out into 70,000 parts by weight of methanol. The mixture separated into two layers. The bottom layer was separated off and the solvents removed by vacuum distillation. The distillation residue was dissolved in 10,000 parts by weight of benzene. After filtration of this solution the solvent was removed by distillation. 3,222 parts by weight of copolymer of glycidyl methacrylate and stearyl methacrylate were obtained. The epoxy-oxygen content was 0.45 milligram equivalents per gram.

*Example IV (final copolymer).—Preparation of dodecyl mercaptan modified copolymer of Example I*

50 parts by weight of the copolymer of Example I having an epoxy-oxygen content of 0.49 milligram equivalents per gram were dissolved in 200 parts by weight of xylene. 10 parts by weight of dodecyl mercaptan were added to this solution. The mixture was heated to its boiling temperature for 20 hours by refluxing it. The temperature of the boiling mixture was 140° C. After cooling the solution was poured out into 750 parts by weight of methanol. The mixture was separated into two layers. The bottom layer was taken up in 200 parts by weight of benzene. The solution obtained was poured out into 750 parts by weight of methanol. The mixture separated into two layers. The bottom layer was separated. The solvents were removed by distilling this bottom layer. 49 parts by weight of copolymer were obtained having a sulfur content of 1.57% by weight.

*Example V (final copolymer).—Preparation of copolymer containing as polar groups a hydroxyl group and a dimethyl phosphite group*

50 parts by weight of the copolymer of Example I having an epoxy-oxygen content of 0.49 milligram equivalents per gram were dissolved in 200 parts by weight of xylene. 8 parts by weight of dimethyl phosphite were added to this solution. The mixture obtained was heated to its boiling temperature for 20 hours by refluxing it, the temperature of the boiling mixture being 142° C. After cooling of the solution it was then poured out into 750 parts by weight of methanol and the resultant bottom layer taken up in 200 parts by weight of benzene. This solution was poured out into 200 parts by weight of methanol and the resultant bottom layer separated off. The copolymer was isolated therefrom by freeze drying. 48 parts by weight of copolymer were obtained having a sulfur content of 0.67 part by weight and a nitrogen content of 0.32% by weight.

*Example VII (final copolymer).—Preparation of diphenyl phosphinodithionic acid modified copolymer of Example I*

50 parts by weight of the copolymer of glycidyl methacrylate and stearyl methacrylate of Example I having an epoxy-oxygen content of 0.49 milligram equivalents per gram, were dissolved in 200 parts by weight of xylene. 18 parts by weight of diphenyl phosphonodithioic acid $(C_6H_5)_2PSSH$ were added to the solution. This solution was heated to its boiling temperature for 20 hours by refluxing it and then, after cooling, poured into 750 parts by weight of methanol. A bottom layer was formed which was taken up in 200 parts by weight of benzene. The solution was poured out into 200 parts by weight of benzene. The solution was poured out into 200 parts by weight of methanol and the resultant bottom layer separated off. The copolymer was isolated therefrom by freeze drying. 48 parts by weight of copolymer were obtained having a sulfur content of 3.48 parts by weight and a phosphorus content of 1.76 parts by weight.

*Example VIII (final copolymer).—Preparation of bis(3-thiaheptyl)phosphite modified copolymer of Example I*

50 parts by weight of the copolymer of glycidyl methacrylate and stearyl methacrylate of Example I were reacted in the same way as described in Example VII with 15 parts by weight of bis(3-thiaheptyl)phosphite

$(C_4H_9SCH_2CH_2O)_2POH$

The solution was purified in the same manner. 49 parts by weight of copolymer was obtained having a sulfur content of 1.00% by weight and a phosphorus content of 1.26% by weight.

Other examples of modified epoxy copolymers of this invention prepared by the same methods include:

IX. 3,5-ditertiary butyl-4-hydroxybenzyl alcohol modified copolymer of Example II
X. Dicresyl phosphate modified copolymer of Example II
XI. Dithioacetic acid modified copolymer of Example II
XII. Dimethyl phosphite modified copolymer of vinyl glycidyl ether and stearyl methacrylate
XIII. 3,5-ditert.butyl-4-hydroxybenzylalcohol modified copolymer of vinyl thioglycidyl ether and lauryl methacrylate
XIV. Stearic acid modified copolymer of glycidyl acrylate and lauryl acrylate
XV. Ethylene diamine modified copolymer of glycidyl methacrylate and vinyl stearate
XVI. Dithiolauryl phosphate modified copolymer of thioglycidyl methacrylate and vinyl stearate
XVII. Diethanolamine modified copolymer of Example II
XVIII. Butyl phenyl phosphonate modified copolymer of Example II
XIX. 3-thiabutylbenzyl phosphonate modified copolymer of Example I
XX. Diphenyl phosphate modified copolymer of Example I The copolymers according to the invention are suitable as additives to lubricants of various kinds. In the first place mineral lubricating oils of varying viscosity may be mentioned, although synthetic lubricating oils as well as lubricating oils containing fatty oils are also suitable. The products may also be incorporated into lubricating greases and hydraulic fluids.

The copolymers according to the invention are also suitable for addition to liquid fuels such as gasoline, kerosene, gas oil and residual fuels.

The copolymers may be added as such to the lubricant. In an advantageous embodiment the product is only partly freed from the solvent, for instance by steam distillation; a small amount of a lubricating oil is then added and finally the remainder of the solvent, are distilled off with steam preferably under reduced pressure. The resultant concentrate can then be diluted with a lubricating oil and/or worked up to a lubricating grease.

The amount of the products according to the invention which are added to lubricants may vary within wide limits. In general the desired improvement is already obtained when the amount added is between 0.1 and 5% and over, and in particular between 1 to 3% of the finished lubricant. In special cases, however, amounts larger than these may be added, for example, in diesel engines operating on fuel having high sulfur content.

In order to demonstrate the utility and improved properties of compositions of the present invention the compositions identified in Tables I and II (2% of copolymer in Venezuelan paraffinic mineral oil having a viscosity of 114 cs. at 100° F.) were tested for the oxidation stability and extreme pressure and anti-wear properties under the following conditions.

TESTS RELATING TO OXIDATION STABILITY AND ANTI-WEAR EFFECT

The doped lubricating oils were tested for their oxidation stability by oxidizing the doped lubricating oil at a temperature of 130° C. in the presence of copper and iron wires. Oxidation was effected by introducing air. The amount of doped lubricating oil was 40 ml., 15 liters of air per hour were passed through and a copper coil and an iron coil were immersed in the oil, each being made of 40 cm. wire having a diameter of 1.6 mm. The oxidation progress was ascertained by determining the acid number of the oil after 72 hours. The doped lubricants were 2% by weight solutions of the additives prepared according to the examples in a Venezuelan paraffinic mineral lubricating oil having a viscosity of 14 cs. at 100° F. The good results compared to the base oil are shown by the following Table I.

TABLE I

| Composition: | Acid number of the oxidized oil, mg. KOH/g. |
|---|---|
| Base oil | 0.60 |
| Copolymer of Example VI | 0.28 |
| Copolymer of Example VII | 0.45 |

The anti-wear effect under high load was determined in the four-ball top at room temperature and at 130° C. and in the four-ball testing apparatus at room temperature. The four-ball top is described in "Four-Ball Top for Testing the Boundary Lubricating Properties of Oils Under High Mean Pressures," G. D. Boerlage and H. Blok, Engineering, volume 144, page 1 (1937), and the four-ball testing apparatus in "Four-Ball Testing Apparatus for Extreme Pressure Lubricants," Engineering, volume 136, pages 46–47 (1933).

The good results of additives prepared according to the examples in a Venezuelan paraffinic mineral lubricating oil having a viscosity of 114 cs. at 100° F. are shown in the following Table II.

The copolymer of this invention are useful also for providing superior load-carrying properties in lubricating oils which contain minor amounts of other agents which are non-reactive with the polymer, such as silicone antifoaming agents, corrosion inhibitors, pour point depressants, extreme pressure agents, oiliness agents, alkylphenol antioxidants, polyacrylate ester viscosity-index improvers, and other materials generally added to lubricants, greases, fuels, and hydraulic fluids.

We claim as our invention:

1. An oil-soluble copolymer containing rings selected from the group consisting of epoxy and thio-epoxy rings of (A) an unsaturated glycidyl compound selected from the group consisting of unsaturated glycidyl ether, unsaturated thioglycidyl ether, glycidyl ester of unsaturated aliphatic carboxylic acid, and thioglycidyl ester of unsaturated aliphatic carboxylic acid and (B) polymerizable ester selected from the group consisting of ester of unsaturated alcohol and saturated carboxylic acid and ester of saturated alcohol and an acrylic acid, said ester (B) having at least one oleophilic radical of from 8 to 30 carbon atoms; wherein 10% to 100% of said rings of the copolymer are modified with a polar agent selected from the group consisting of an alkyl acid phosphite, an alkyl acid thiophosphite, and diaryl phospinodithionic acid and the mole ratio of components (A) and (B) varying from 1:10 to 1:1, respectively.

2. An oil-soluble copolymer containing epoxy rings of glycidyl methacrylate and $C_{8-18}$ alkyl methacrylate, wherein 10% to 100% of said rings of the copolymer are modified with an alkyl acid phosphite and the mole ratio of the glycidyl methacrylate to the $C_{8-18}$ alkyl methacrylate being from 1:10 to 1:1, respectively.

3. An oil-soluble copolymer containing epoxy rings of flycidyl methacrylate and $C_{8-18}$ alkyl methacrylate, wherein 10% to 100% of said rings are modified with a diaryl phosphinodithionic acid and the mole ratio of the glycidyl methacrylate to the $C_{8-18}$ alkyl methacrylate being from 1:10 to 1:1, respectively.

4. An oil-soluble copolymer containing epoxy rings of glycidyl methacrylalte and stearyl methacrylate, wherein 10% to 100% of said rings are modified with dimethylphosphite and and the mole ratio of the glycidyl methacrylate to stearyl methacrylate varying from 1:10 to 1:1, respectively, said copolymer having a molecular weight of from 25,000 to 800,000.

5. An oil-soluble copolymer containing epoxy rings of glycidyl methacrylate and stearyl methacrylate, wherein 10% to 10% of said rings are modified with diphenyl phosphinodithionic acid and the mole ratio of the glycidyl methacrylate to stearyl methacrylate varying from 1:10 to 1:1, respectively, said copolymer having a molecular weight of from 25,000 to 800,000.

TABLE II

| Composition | Concentration of the solution in the base oil (percent by weight) | Diameter of the sliding surface in mm. | | |
|---|---|---|---|---|
| | | Four-ball top | | Four-ball testing apparatus, room temperature |
| | | Room temperature | 130° C. | |
| Base oil | | 0.28 | 0.33 | 1.53 |
| Copolymer of Example VII | 2.4 | 0.17 | 0.22 | 0.49 |
| Copolymer of Example VIII | 6.7 | 0.14 | 0.15 | 0.43 |

No references cited.

JOSEPH L. SCHOFER, *Primary Examiner.*

H. WONG, Jr., *Assistant Examiner.*